Aug. 18, 1959 E. W. NILSSON 2,899,843
DRIVE MECHANISM FOR FLYING SHEARS AND THE LIKE
Filed Feb. 9, 1956 2 Sheets-Sheet 1

INVENTOR

EINAR W. NILSSON

BY Francis J. Klempay
ATTORNEY

Aug. 18, 1959     E. W. NILSSON     2,899,843
DRIVE MECHANISM FOR FLYING SHEARS AND THE LIKE
Filed Feb. 9, 1956     2 Sheets-Sheet 2

INVENTOR
EINAR W. NILSSON
BY
ATTORNEY

United States Patent Office 2,899,843
Patented Aug. 18, 1959

2,899,843

DRIVE MECHANISM FOR FLYING SHEARS AND THE LIKE

Einar W. Nilsson, Youngstown, Ohio

Application February 9, 1956, Serial No. 564,430

27 Claims. (Cl. 74—681)

The present invention relates to a new and novel drive mechanism in general and particularly to that type of drive mechanism utilized to drive oscillating or rotating devices where the speed of the output shaft must be adjustable over a wide range of angular velocities. As an example, drives of this type may be provided to power flying cut-off equipment and the like where a continually moving strip of material is severed into predetermined lengths.

A considerable number of such devices have been proposed in the prior art for rocking, in the case of strip, a carrier back and forth while shears carried thereby are actuated to cut the strip. In the severing of continuous sections of tubes or bars, flying saws may be found more practical but these also are usually mounted on a rotating or oscillating carrier. Most of the prior art drive mechanisms are operative to accelerate the carriers until they obtain the synchronous speed of the continually moving strip or other stock and the cut is made at this time, but the period of synchronism between the shears or saws and the material is usually for such a very small interval of time that the shears or saws, as well as the carriers and drive mechanism, are subjected to extremely heavy shock loads when the material is being severed. This condition has often dictated large and heavy equipment and complicated mechanical interconnections for withstanding and distributing the shock loads, but, as should be readily apparent, the increased mass of the apparatus is also objectionable because the carrier must be quickly and easily accelerated and decelerated to obtain the desired lengths of severed material.

To alleviate these problems, I have developed a type of flying shear and drive mechanism therefore, which is disclosed and claimed in my co-pending patent application, Serial No. 390,288, filed November 5, 1953, which has since matured into U.S. Patent No. 2,829,713, wherein is taught the construction of a drive with the arrangement being such that the carrier and shears associated therewith are in direct synchronism with the speed of material to be severed for extended periods of time and thus shock forces are substantially eliminated. This construction calls for an ordinary Hooke-type universal power coupling, or other like means, wherein the angle between the driving and driven members is set to achieve the desired periods of relative constant velocity of the carrier which are in direct synchronism with the continually moving material.

But perhaps the greatest objection to the apparatus proposed heretofore is their lack of versatility in that they are not readily or easily adjustable for cutting different lengths of predetermined size from the material to be severed. As an example, an operator may desire to sever a certain number of sheets of one length and then adjust the apparatus for cutting a number of sheets of a different length. Many machines are limited to multiples of a standard length, effecting "miss-cuts," whereby the saws or shears are held inoperative during a number of severing cycles, which is objectionable because of the increased wear on the machines as a large portion of their operating time is devoted to running with the sheet but not severing it, while other proposed apparatus utilizes complicated mechanical interconnections between the drive and the carrier. It should be understood, however, that the drive of the present invention may also be adapted for "miss-cut" type shears which may be advantageous where the shears or saws are oscillating continuously at high speeds and where extreme variations in the speed of the drive itself would cause heavy acceleration and deceleration forces.

At the outset, a basic understanding of the problems involved in designing and constructing a drive mechanism for such rotating and reciprocating elements should be kept in mind. Not the least of these problems is that for effective shearing, the carrier and blades, or saws attached thereto, must, at the time the material is severed, be traveling in synchronism with the continually moving material. This requires that the drive mechanism for the carriers be controlled by the speed of material travel (i.e. the shear carrier and the drive mechanism are usually actuated in response to the speed of the feeding and/or forming rolls). When it is desired to change the length of the sheared material, it is seen that the cyclic rate of the rocking shears or the rotating saws must be curtailed to permit additional material to be moved between cuts, but yet the shears, when they are operative to sever the material, must still be in direct synchronism with the speed of the material. Or, approaching the problem differently, if the speed of the feeding and forming rolls is increased, the cyclic rate of the carrier must be kept at the same previous value, while the speed of the shears during that cycle must be increased to match the velocity of the continuously moving material. If these conditions are not fulfilled, it is obvious that the apparatus will be subjected to large shock forces and, in many cases, be inoperative.

Therefore, it is the primary object of the present invention to provide a new and novel drive mechanism for rotating and reciprocating devices wherein it is possible to vary the speed of the output shaft over a wide range during a fraction or one or more revolutions thereof. If the drive mechanism is such that the speed of the output shaft may be varied appreciably, many of the problems encountered, as discussed above, will be substantially mitigated resulting in more efficient and versatile apparatus.

A further object of the present invention is to provide drive apparatus having an output shaft wherein stepless variations in the angular velocity of said output shaft are obtainable even when the drive has been adjusted for wide speed variations. In this manner the response of the apparatus is extremely good and, when used to drive flying cut-off apparatus, the chance of shock forces being experienced when changing the length of severed equipment is alleviated.

Yet another object of the present invention is to provide rotary or reciprocating drive mechanism in which the output shaft thereof may have substantial periods of practically constant angular velocity during its revolution or period of revolutions. The sustained period of uniform angular velocity allows the shearing of the continuously moving material without subjecting it to the shock forces usually encountered in the operation of such equipment.

A further object of the invention is the provision of a drive mechanism having the characteristics outlined above which is readily adjustable in itself to obtain the cyclic variation in the angular velocity of the output shaft over a wide range of speed. By accomplishing the above objects in the drive itself the driven device, such as flying cut-off apparatus, may be constructed with a minimum of parts thereby reducing the inherent inertia and mass of the driven element and greatly simplifying the construction of the shear.

Another object of the invention is the provision of a drive mechanism which is of rugged construction and may be operated at high speed for extended periods of time. This is especially important when the present drive is used in flying cut-off apparatus as the material being severed cannot be readily halted for maintenance and repairs of the drive mechanism or shearing apparatus. The various gear trains and other apparatus employed in the drive are of such size to impart inherent strength and this object is further propagated by the mounting of all adjusting equipment in the drive itself thereby simplifying the carrier for the shear of rotary saws as is readily apparent.

Yet a further aspect of the present invention is the construction of a new and novel drive mechanism having the characteristics outlined above which is of the utmost simplicity in construction and arrangement, as will be understood by those familiar with and skilled in this particular art.

For further revelation of my invention as well as the disclosure of other objects and advantages thereof, reference should now be had to the following detailed specification and accompanying drawing wherein is described and shown a single preferred embodiment of the drive mechanism.

Figure 1:
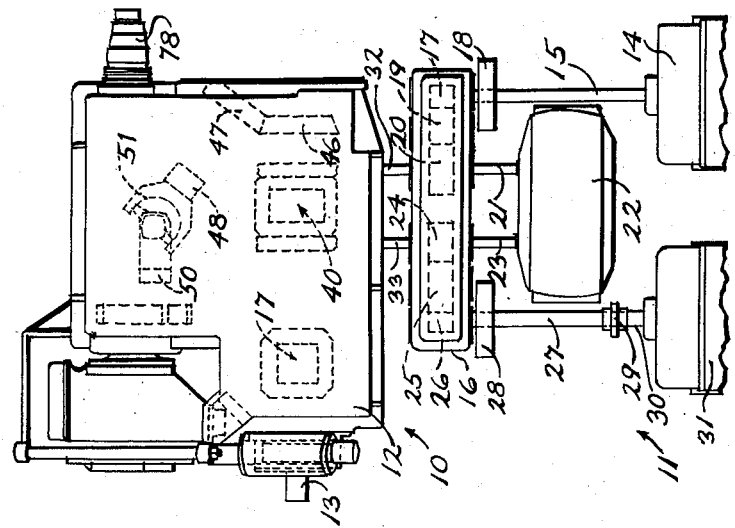
Figure 1 is a plan view of the new and novel drive mechanism constructed in accordance with the teachings of my invention.
Figure 3:
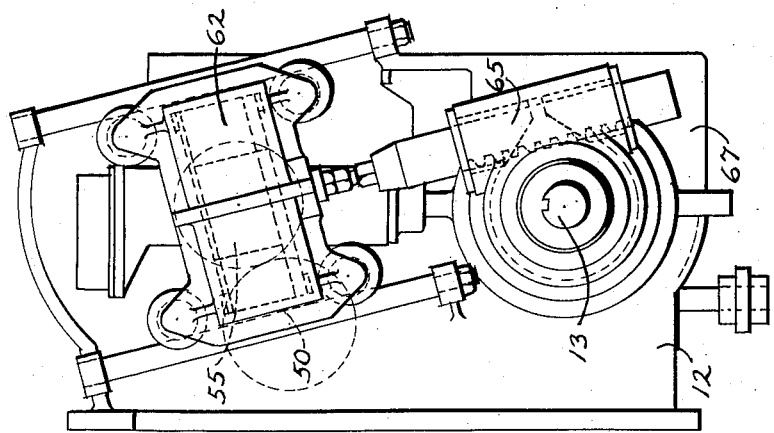
Figure 3 is an end elevation of the rack and pinion arrangement encasing the output shaft.

Referring now to the drawing, and initially to Figure 1 thereof, the numeral 10 designates generally the new and novel drive mechanism of the present invention comprising the various motors 11 and the gear trains mounted in the gear housing 12 for driving the output shaft 13 in a desired manner as will be hereinafter more fully described. The motor 14 is the main driving motor for the apparatus and may be of the double shaft type, one shaft driving the spindle 15 and the other shaft, not shown, driving the various feeding and forming equipment, such as roller levelers or pinch rolls, also not shown, for moving the material to be severed. It should be understood, however, that this arrangement is not the only practical one, as the spindle 15 may be directly connected to a driven shaft of such feed mechanism or the motor 14 may be used only to power the apparatus 10 while suitable electrical control apparatus, not shown, would be provided for synchronizing the speed of the motor 14 with that of the material to be severed.

The spindle 15 is journaled in the gear housing 16 and carries on its far end the gear 17. Intermediate the ends of the spindle 15 is the flywheel 18 whose use will become readily apparent. The gear 17 cooperates with the intermediate gear 19 which in turn drives the gear 20 mounted on the input shaft 21 of a conventional variable speed transmission 22. The output shaft 23 of the variable speed drive device is connected to a like gear train comprising the gears 24, 25, and 26 with the gear 26 being attached to the outer end of the spindle 27 which is journaled in the gear housing 16 and carries the flywheel 28. The spindle 27 communicates through the hydraulic slip clutch 29 to the drive shaft 30 of an adjustable speed motor 31.

Figure 2:
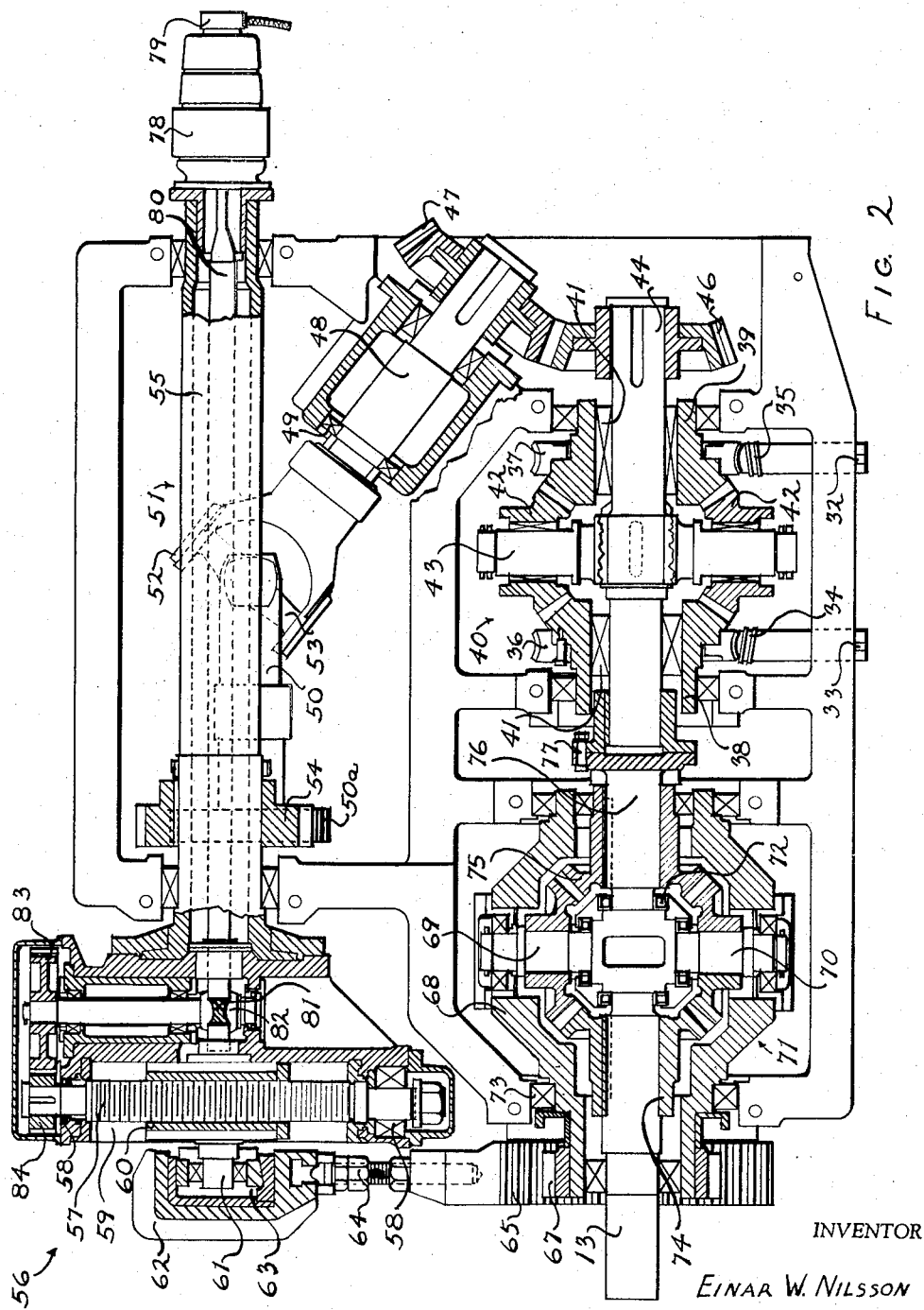
Figure 2 is a sectional top plan view of a portion of the apparatus shown in Figure 1.

Also rigidly secured to the gears 20 and 24 and extending outwardly therefrom are the two shafts 32 and 33, respectively, which extend through the bearing housing 12 and carry on their forward ends the worms 34 and 35 (see Figure 2). The worms 34 and 35 are adapted to mesh with the two annular mating worm gears 36 and 37, respectively, and these are rigidly secured to the two bevel gears 38 and 39, respectively, which form an integral part of the differential drive mechanism herein designated by the numeral 40. The bevel gears 38 and 39 are spaced from each other but are in axial alignment and are journaled in the housing 12 by the plurality of bearings 41. Between the bevel gears 38 and 39, and meshing with the same, are a plurality of small bevel gears 42 which are journaled by and supported by a common spider-like member 43 positioned in axial alignment with the bevel gears 38 and 39 and rigidly secured to the large shaft 44. This structure represents a conventional differential drive mechanism and, as will be readily understood, the spider-like differential element 43 and the shaft 44 rotates at a speed equaling the resultant of the rotational speeds imparted thereto through the input shafts 32 and 33.

Considering now the operation of the apparatus thus far described, the motor 14 is operative to drive the feeding roll, not shown, and as a consequence the material to be severed at a relatively constant speed while at the same time driving the input shaft of the variable speed drive unit 22 at the same speed through the gears 17—20. The output shaft 23 of the variable speed drive unit 22 and the adjustable speed motor 31 are connected through the pinions 26—24 to the bevel gear 38 of the differential drive mechanism 40 for changing the speed of the output shaft as will be hereinafter more fully described. The variable speed drive unit 22 tends to make the motor 31 superfluous but it should be understood that the variable speed drive unit is comparatively delicate and cannot sustain high shock loads. The flywheels 18 and 28 further tend to reduce the need of the motor 31 but this motor is retained so that when additional power is needed, as under shock loads, the motor 31 may very well supply the additional power.

Because the relative speeds of motors 14 and 31 cannot be readily controlled by electrical means, the hydraulic slip clutch 29 has been inserted between the shafts 27 and 30. The shaft 30 should be driven at a slightly higher speed than the shaft 27 with the clutch 29 providing the necessary flexibility for driving the spindle 27. The slip may also occur in the motor 31 itself where the motors 14 and 31 are interconnected to provide for such slip and the clutch 29 would then be replaced with an ordinary flexible coupling.

The differential bevel gears 38 and 39 will preferably revolve in the opposite directions for the type of differential shown which is made possible by selecting opposite hands on one of the worm gear sets 34—36 and 35—37, and suitable gear ratios, since the output of the variable speed drive unit 22 and the driving motor 14 always revolve in the same direction and, as a consequence, so do the shafts 32 and 33.

Referring now in particular to Figure 2 of the drawing, the shaft 44 carries on its outer end the bevel gear 46 having its teeth mounted at an acute angle with respect to the center line of the shaft 44. Cooperating and meshing with this gear 46 is a similar bevel gear 47 having like teeth and secured to the end of the angled shaft 48. Upon rotation of the shaft 44 from the differential drive 40 the shaft 48 is caused to rotate in the opposite direction at a proportional angular velocity depending upon the ratio of the number of teeth in the bevel gears 46 and 47. Although in the illustrated embodiment this ratio is one to one, it may be desirable in some applications to increase this ratio so that the shaft 48 is caused to rotate at a higher or lower r.p.m. than the shaft 44 as will be evident upon further consideration of the specification.

The shaft 48 is journaled in the gear housing 12 by means of the bearings 49 and the other end of said shaft is connected to the spindle 50 through the large high-powdered Hooke-type universal joint 51. This joint is of the ordinary type, each shaft carrying one forked member 52 mounted at the end thereof, the axes of which are not in line with each other but merely intersect in a point. The two forked members are drivingly connected with each other by means of interconnecting right angularly related driving pins 53.

Figure 4:
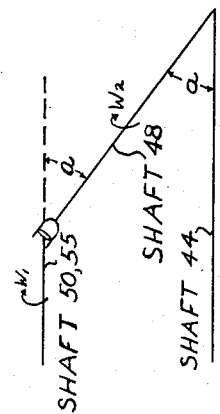
Figure 4 is a schematic representation of the drive connection between the parallel gear trains.

As is well known in the art, in a driving connection comprised of a Hooke-type universal joint, there is non-uniformity of motion between the driven and driving elements, in this instance 50 and 48, respectively, although, of course, the driven and driving element have the same cyclic periods. Various mathematical formulae can be developed for this type of driving connection wherein the ratio of the rotational speed $W_1$ of the driven member to the rotational speed of the driving member $W_2$ depends upon the acute angle $(a)$ made by the intersection of the axes of the driven and driving members and the angular displacement $(b)$ of the driving yoke of said universal joint defined by the above mentioned axes. These symbols are indicated on Figure 4 where, for a better understanding of the principles involved, the connections between the shafts 50, 48, and 44, as well as the universal power coupling have been depicted schematically.

It will be observed that the driven member of the power train, in this case the shaft 50, will rotate alternately at higher and lower speeds than the driving member 48 twice during each complete revolution of the latter. And it will further be observed that relative non-uniformity becomes more pronounced as the angle made by the axes of the driving and driven elements, $(a)$, is increased. The utility of this movement will be completely explored further in the specification when considering the operation of the assembled drive mechanism.

In accordance with the above principles, and those set forth in my co-pending patent application, above identified, I have determined that if the driving and driven elements 48 and 50 are caused to intersect at an angle, in the order of thirty-seven degrees, and are joined by a Hooke-type universal joint connection, there will be produced in the driven member 50, a motion which will substantially exactly compensate for the harmonic variations of the driving component of the driving member 48, and the resultant is that the shaft 50 will have, generally speaking, an angular velocity assuming a cosinusoidal wave form near the 0 and 180 degree portions and leveling off to a substantially constant value for an extended period during the intermediate positions between these two extremes. It should be understood, however, that the selection of the magnitude of the angle $(a)$ is one of the design, thirty-seven degrees having been found to be particularly well adapted in use with flying cutoff equipment, and any angle within the range of twenty to fifty-five degrees is entirely possible and contemplated depending upon the amplitude of the angular velocity and the length of periods of constant velocity deemed necessary to fulfill any given requirements. In addition, the Hooke-type universal joint is not the only coupling which will result in such motion of the driven shaft, as, elliptical gears, or other like means, can be used to substantially compensate for variations experienced when coupling parallel gear trains.

Referring again to Figure 2 of the drawing, the shaft 50 is adapted to be fitted on the extreme end thereof with a gear 50a, which mates with a like gear 54 keyed to the longitudinally extending hollow tubular shaft 55. The shaft 55 is generally parallel with the shaft 44 and is journaled for rotation in the gear housing 12 although both ends thereof protrude therethrough. The forward end of the shaft 55 carries an adjustable crank assembly, herein denoted by the numeral 56, which rotates with the shaft 55 in a pulsating motion determined by the angle of the Hooke-type universal coupling 51. A crank screw 57 is mounted by bearings 58 normally to the tubular shaft 55 in a channel-shaped depression of the bracket 59 of the adjustable crank assembly 56. A follower nut 60 is adapted to be threadably received by the crank screw 57 and the nut 60 has a longitudinally projecting trunnion 61 of decreased cross sectional area which is rotatably received in the scotch yoke 62 by a bearing mounted on the slide block 63. Rigidly secured to the yoke 62 by means 64 is the rack 65 whose use will become readily apparent.

In the drawing, the center line of the trunnion 61 is shown to coincide with the center axis of the tubular shaft 55, and it is observed that upon said shaft being rotated, that when the yoke 62 and the trunnion 61 are in this position, no motion will be imparted to the rack 65. If, however, the nut 60 is moved so that the center line of the trunnion 61 and the scotch yoke 62 do not coincide with the axis of the tubular shaft 55, the rack 65 will experience an oscillatory motion whose amplitude is directly dependent upon the distance the trunnion and yoke are off-center with respect to the axis of the tubular shaft 55.

The rack 65 drives the large annular pinion gear 67 which is keyed to the end of a rotatable annular framework 68 mounting a pair of planetary bevel gears 69 and 70 of a differential unit designated generally by reference numeral 71. As is readily apparent, the framework 68 must be adapted for rotation and this is accomplished in the present instance by the large circular bearings 73. Forming the remainder of the differential drive mechanism 71 are the pair of opposed and axially aligned bevel gears 74 and 75 with the bevel gear 74 being keyed directly to the output shaft 13 while the bevel gear 75 is keyed to the shaft 76 which in turn is rigidly connected to the shaft 44 by means of the flanged coupling 77.

In the operation of the assembled drive mechanism, the motor 14 is energized to drive the shaft 32 while the variable speed drive unit 22 and the adjustable speed motor 31 drive the shaft 33 in effective variable speed relation and the resultant of the output is transmitted through the differential drive mechanism 40 to the shaft 44. This causes the rotation of the shaft 55 through the bevel gears 46 and 47 and the Hooke-type coupling 51 in such a manner that its velocity is decreased during two portions of each revolution and increase at a 90 degrees spacing during the same revolution. When the trunnion 61 is aligned with the axis of the shaft 55, no motion will be imparted to the rack 65.

When the trunnion 61 is so aligned, it should be obvious that the output shaft 13 will rotate at a constant angular velocity due to the mechanical connection between the shaft 44, the shaft 76, and the differential mechanism 71 in the opposite direction to the shaft 44 since no motion is imparted to the rack 65. When the drive mechanism is operated in this manner the shear or other flying cut-off equipment carried thereby may be operative to sever a certain length of the continually moving material assuming synchronous speed between the stock and severing device. When it is desired to increase the length of the severed strips to, for the purpose of illustration, twice the length as severed previously, the variable speed drive unit must be adjusted so that the resultant rotation of the shaft 44 is cut to one-half the original value. The strip of material is still traveling at the same speed but such a reduction in the speed of shaft 44 will also reduce the shear or saw speed by half and it is necessary to return these elements to their original stock-synchronous speed.

In the present instance this is accomplished by moving the nut 60 and the trunnion 61 carried thereby to an off-center relation with respect to the center axis of the shaft 55 so that the rack 65 is caused to oscillate and this movement is transferred to the differential 71 where it is superimposed on the constant angular velocity of the shaft 44 and transmitted to the output shaft 13. In the case at hand, where it is desirable to double the length of the severed strip, the rock 65 would be adjusted so that it superimposes on shaft 13 one-half the desired velocity at its highest point in amplitude. This would be added to the half of the velocity needed, delivered by the shaft 44 in the differential 71, and then transferred to the output shaft 13.

In describing the resultant angular velocity wave form transmitted to the output shaft 13 during one revolution, it should be remembered that the rack 65 has a flattened cosinusoidal angular velocity wave form due to the action of the joint 51 while that delivered from the shaft 44 is constant at all times. It is also noted that for each revolution of the shaft 44 the rack 65 will have moved back and forth resulting in its velocity being added to that of the shaft 44 during one half of a revolution thereof and subtracted during the latter half of the revolution. Thus, if the rack is operative to deliver one-half of the desired velocity, the output shaft will rotate at the desired velocity for an interval of time and then 180 degrees later the velocity of the output shaft will be zero. It is also noted that if longer cuts of the continually moving material are desired, the yoke 62 will have to be positioned to provide greater eccentricity, and the rack will be supplying more than one-half of the resultant velocity of the output shaft thus causing the output shaft to change its direction of rotation during part of each revolution as is readily apparent.

Because, during a time interval, a portion of the velocity supplied by the rack is substantially a straight line function due to the action of joint 51 and the component of velocity from the shaft 44 is a straight line function, the resulting angular velocity will have an interval of constant amplitude. This, as explained previously, may be highly important when shearing moving material to achieve synchronous speed between the stock and shear. As the uniform period superimposed motion increases as the eccentricity of the scotch yoke 62 is increased, the output shaft 13 will have a longer distance of uniform speed in which the cutting operation may be performed as longer cuts are performed.

It is also possible to decrease the length of the severed strips of material from the standard length and this is easily accomplished by adjusting the yoke to the other side of the center axis of shaft 55 wherein the motion of the rack is caused to subtract from that of the shaft 44 during the shearing or cutting cycle.

It is entirely possible for the eccentricity of the yoke 62, the trunnion 61, and the nut 60 to be adjusted by hand, and in this case, the trunnion and nut would be one integral part with an exposed end for nut adjustment, but, in the present embodiment, this adjustment is accomplished by a brake motor 78 flange-mounted on one end of the tubular shaft 55 and rotating therewith while the rotary type contactor 79 permits the electrical leads to stay stationary at all times. The drive shaft of the brake motor 78 is connected to the shaft 80 extending inside the shaft 55 the length thereof and on the far end carries worm 81. The worm 81 meshes with a gear mounted on the normal shaft 82 which carries gear 83 and is adapted to mate with a gear 84 carried by crank screw 57. As long as the shaft of the motor 78 is held by its brake, no movement of the crank nut 60 will take place, and the adjusting mechanism rotates with the tubular shaft 55 as a solid nut and the trunnion stays in the same position. When the motor 78 is started, the crank screw 57 will move the crank nut 60 at a very slow rate due to the large reduction in the gears 82 and 83 and the fine pitch of the crank screw.

It is contemplated that synchronizing and control apparatus will be provided in an installation of this type to control the drive mechanism. As an example, the working of the brake motor 79 may be interconnected by suitable mechanical or electrical means, not specifically shown, with the control screw of the variable speed drive unit and operate in response thereto. Further, the adjustment of the variable speed drive unit may be actuated by an operator at a central control panel with a gauge indicating the exact length of material being cut.

When the present drive is utilized to drive the rocking shear disclosed in my co-pending application, Serial No. 390,288, the need of the Hooke-type universal joint is still apparent but the means for adjusting the rocker arm eliminated as these adjustments take place in the drive mechanism itself. In addition, the length of travel of the shear, or rocking amplitude, is always kept at the same value which, in some cut-off installations, is important.

It should thus be apparent that I have accomplished the objects initially set forth by providing a new and novel drive mechanism of the type for powering rotating or oscillating devices, such as rotary or rocking shears for severing various lengths of continually moving material. The present invention contemplates driving the output shaft at different maximum angular velocities, with said shaft having portions of substantially constant angular velocity during each revolution thereof wherein the maximum speeds increase as the speed of the input, or resultant input, is decreased. In flying cut-off apparatus, the cyclic rate of the apparatus must be changed each time a new length is to be cut, and the speed of the shears held at a constant value determined by the speed of the moving material, and my drive mechanism is ideally suited for handling equipment demanding such drive characteristics.

Yet another aspect of the present invention is that all necessary adjustments for changing the angular velocity of the output shaft during a fraction or one or more revolutions thereof are carried in the drive mechanism itself. The present construction of the apparatus involves two generally parallel gear trains joined in the first instance by a coupling involving a Hooke-type universal power joint operative to transform constant velocity to a velocity having a generally cosinusoidal wave form with the top portion thereof being flattened and defining a zone of constant speed. In the illustrated embodiment, this angle is in the range of thirty-seven degrees but, as previously explained, the specific angular relationship will depend upon the specific use of the drive intended. Also, if the zone of constant speed is not important, the two parallel gear trains may be joined by more conventional apparatus whereby the constant velocity of one shaft is transformed to the other. An adjustable carrier is mounted on one end of the parallel gear train having the non-uniform angular velocity, when a Hooke-type universal joint is employed, and is adapted to be moved off-center by any given amount. This carrier in turn drives a rack and the motion of the rack is transmitted through a differential drive mechanism and superimposed upon the constant velocity of the input shaft. For accurately and precisely varying the angular velocity of the output shaft, means are provided for controlling the eccentricity of the carrier so that all adjustments are contained in the drive mechanism. Further, the controlling of the speed of the driven element in the mechanism itself means that the construction of the rotary and rocking shears may be greatly simplified resulting in a more practical apparatus.

In addition, I have provided apparatus wherein the speed of the output shaft is almost infinitely variable over a wide range during one or more revolutions thereof, the output shaft actually stopping and reversing direction for some settings, wherein the change in the velocities is smooth and stepless in all respects. These features of the drive mechanism, when employed to drive flying cut-off equipment, provides more versatile apparatus as has been previously described.

Yet a more specific feature of my invention is the use of a main drive motor in connection with a variable speed drive unit and an adjustable speed motor whereby the r.p.m. of the output shaft is infinitely variable although the variable speed drive unit is a relatively delicate instrument and effective use thereof has not been realized in the prior art for such applications.

Although I have taught a specific embodiment of the invention, it should be apparent that many changes may be made therein without departing from the scope thereof, and therefore reference should be had to the appended claims in determining the full coverage I desire.

I claim:

1. In a drive system for oscillating or rotating devices or the like; the combination of a main driving means and a variable speed transmission, a differential gear assembly having a pair of independently rotatable gears and a differential element engaged by each of said rotatable gears and rotatable at a speed which is a function of the relative speeds of said independently rotatable gears, said means driving one of said independent gears and said variable speed transmission driving the other, said differential element keyed to a first shaft, a second shaft disposed in angled relation to said first shaft, means for drivingly connecting said first and second shafts, a third shaft disposed in generally parallel relation to said first shaft, means interconnecting said second and third shafts whereby said third shaft is caused to have a non-uniform motion relative to the motion of said first shaft, an output shaft driven primarily by said first shaft, and means for superimposing the motion of said third shaft on the motion of said output shaft whereby said output shaft is caused to rotate at an angular velocity which is a function of the resultant of said first and third shaft angular velocities.

2. Apparatus according to claim 1 further characterized in that said means connecting said first and third shaft comprises a Hooke-type universal power coupling whereby said third shaft is caused to rotate with a non-uniform angular velocity with respect to the angular velocity of said first shaft, said angled relation between said second and said third shaft being in the order of twenty to fifty-five degrees, and said non-uniform angular velocity having substantial portions where said angular velocity thereof is generally constant.

3. Apparatus according to claim 1 further characterized in that said means for superimposing the motion of said third shaft on the motion of said output shaft comprises an extension rotatably carried with said third shaft, said extension driving a scotch yoke, a rack carried by said yoke, and means to adjust said extension eccentrically of the center axis of said third shaft whereby when said extension is aligned with the center axis of said third shaft no motion is imparted to said rack, and when said extension is off-center with respect to the center axis of said third shaft, an oscillating motion is transmitted to said rack which is a funcion of the non-uniform motion of said third shaft.

4. Apparatus according to claim 3 further characterized in that said means for superimposing the motion of said third shaft on said motion of said output shaft comprises a second differential gear assembly having a pair of independently rotatable gears and a differential element engaged by each of said independently rotatable gears, said rack driving said differential element, one of said independently rotatable gears connected to said first shaft, and the other of said independently rotatable gears connected to said output shaft.

5. In a drive mechanism for oscillating or rotating devices and the like; the combination of a first shaft, means to drive said first shaft, a second shaft, means interconnecting said first and second shaft whereby said second shaft has non-uniform motion with respect to said first shaft, an output shaft, means to impart the resultant motion of said first and second shaft on said output shaft, said means to impart including a normally disposed crank screw adapted for rotation with said second shaft, a crank nut carried by said crank screw, said crank nut having an extending trunnion, said trunnion rotatably journaled in a scotch yoke, a gear rack rigidly carried by said scotch yoke, and means to turn said crank screw whereby said crank nut is caused to move normally with respect to the center axis of said second shaft and when said nut is off-center with respect to the center axis of said second shaft an oscillatory motion is imparted to said rack.

6. Apparatus according to claim 5 further characterized in that said means for rotating said crank screw comprises a shaft extending inside of said second shaft, means to rotate said extending shaft, and means connecting said shaft with said crank screw whereby upon rotation of said extending shaft said crank screw is caused to move said crank nut normally toward or away from the center axis of said second shaft.

7. Apparatus according to claim 5 further characterized in that said means for rotating said crank screw comprises a brake motor mounted on the other end of said second shaft, said second shaft being tubular, an extension of the shaft of said brake motor extending the length of and inside of said second shaft, said extending shaft having a worm mounted thereon adapted to rotate a gear, said gear meshing with a similar gear, said similar gear mounted on one end of said crank screw, and means for energizing said brake motor, the arrangement being such that when said brake motor is energized said yoke is caused to move normally toward or away from the center axis of said second shaft.

8. In a drive mechanism for oscillating or rotating mechanisms and the like; the combination of a main driving motor and a variable speed driving motor, a variable speed drive device having input and output shafts, means connecting the shaft of said driving motor with said input shaft of said variable speed drive device, means connecting said variable speed driving motor with said output shaft of said variable speed drive device, means for providing slip between said variable speed drive device and said variable speed driving motor, a differential gear assembly having a pair of independently rotatable gears and a differential element engaged by each of said rotatable gears and rotatable at a speed which is a function of said independently rotatable gears, said output and input shafts of said variable speed drive device each driving one of said pair of independently rotatable gears, said differential element keyed to a shaft, an output shaft communicating with said shaft, and means to modify the motion of said output shaft independently of the motion of said shaft.

9. In a drive mechanism for use in driving oscillating or rotating devices such as flying cut-off shears and the like; the combination of a first shaft, means to drive said first shaft at a uniform angular velocity, a second shaft, means to drive said second shaft in fixed relation to said first shaft, an output shaft, means for superimposing the resultant motion of said first and second shafts on said output shaft, said motion of said second shaft being non-uniform with respect to the velocity of said first shaft, and means for modulating said non-uniformity imposed on said output shaft, the arrangement being such that when the velocity of said first shaft is decreased said velocity of said output shaft may remain the same during a portion of its angular travel.

10. Apparatus according to claim 9 further characterized in that said means for driving said second shaft comprises a third shaft, said first and second shafts being in a generally parallel relation, said third shaft having an angular disposition with respect to said first and second shafts, and a Hooke-type universal joint interconnecting said third shaft and said second shaft whereby upon rotation of said first shaft said second shaft is caused to rotate with non-uniform motion with respect to the motion of said first shaft.

11. Apparatus according to claim 10 further characterized in that said angular disposition of said third shaft with respect to said second and first shafts is in the order of twenty to fifty-five degrees.

12. In a drive system for oscillating or rotating devices or the like; the combination of a differential power drive having an output shaft and a pair of input drive members whereby the instantaneous velocity of the output shaft is a function of the relative instantaneous velocities of the input drive members, means to drive one of said input drive members at a uniform angular velocity, and means to drive the other of said input drive members at an adjustable oscillatory angular velocity whereby the velocity of said output shaft is cyclically changed from a uniform angular velocity.

13. Apparatus according to claim 12 further characterized in that said means to drive said other input driving member is symmetrical whereby the overall time and position effect of said velocity change in said output shaft is zero over a predetermined cycle of partial or multiple revolutions of said one of said input driving members.

14. In a drive system for oscillating or rotating devices or the like; the combination of a main driving means and a variable speed driving means, a first shaft, a differential gear assembly, said main driving means and said variable speed driving means driving the inputs of said differential gear assembly, said differential gear assembly driving said first shaft at an angular velocity which is a function of the relative speeds of said main driving means and said variable speed driving means, a second shaft disposed in angled relation with respect to said first shaft, means for drivingly connecting said first and second shafts, a third shaft disposed in generally parallel relation to said first shaft, means interconnecting said third and second shafts, said means for drivingly interconnecting and said means interconnecting being such that said third shaft is caused to have a non-uniform angular velocity relative to the angular velocity of said first shaft, an output shaft driven primarily by said first shaft, and means for superimposing the angular velocity of said third shaft on said output shaft whereby said output shaft is caused to rotate at an angular velocity which is a function of the resultant of the angular velocities of said first and third shafts.

15. Apparatus according to claim 14 further characterized in that said means for superimposing the motion of said third shaft on said output shaft comprises a second differential assembly, the inputs of said second differential assembly being interconnected with said first and third shafts, and said second differential assembly driving said output shaft at an angular velocity which is a function of the resultant of the angular velocities of said first and third shafts.

16. In a drive system for oscillating or rotating devices or the like; the combination of a main driving means and a variable speed driving means, a first shaft, a differential gear assembly, said main driving means and said variable drive means driving the inputs of said differential drive assembly, said differential gear assembly driving said first shaft at an angular velocity which is a function of the relative speeds of said main driving means and said variable speed driving means, a second shaft, means interconnecting said first and second shafts, said means interconnecting causing said second shaft to rotate at a non-uniform angular velocity relative to the angular velocity of said first shaft, an output shaft driven primarily by said first shaft, and means for superimposing the angular velocity of said second shaft on said output shaft whereby said output shaft is caused to rotate at an angular velocity which is a function of the resultant of the angular velocities of said first and second shafts.

17. Apparatus according to claim 16 further characterized in that said means interconnecting comprises a Hooke-type universal power coupling having an angular disposition between the driving and driven shafts thereof, and said angular disposition being in the order of twenty to fifty-five degrees.

18. In a drive system for oscillating or rotating devices or the like; the combination of a first shaft, means to drive said first shaft, a second shaft, means interconnecting said first and second shafts, an output shaft, means for superimposing the angular velocities of said first and second shafts on said output shaft whereby said output shaft is caused to rotate at an angular velocity which is a function of the resultant of the angular velocities of said first and second shafts, and means to adjustably vary the amplitude of the angular velocity of said second shaft superimposed on said output shaft.

19. Apparatus according to claim 18 further characterized in that said means interconnecting comprises means for rotating said second shaft at a non-uniform angular velocity relative to the angular velocity of said first shaft.

20. Apparatus according to claim 19 further characterized in that said output shaft has periods of constant angular velocity during each cycle of angular velocity thereof.

21. Apparatus according to claim 18 further characterized in that said means to drive said first shaft comprises a pair of input drive members, means to drive one of said input drive members at a uniform angular velocity, and means to drive the other of said input members at a uniform adjustable angular velocity, and means to drive said first shaft at an angular velocity which is a function of the resultant of the angular velocities of said input members.

22. Apparatus according to claim 18 further characterized in that said means interconnecting comprises a Hooke-type universal power coupling having an angular disposition between the driving and driven shafts thereof, and said angular disposition being in the order of twenty to fifty-five degrees.

23. In a drive system for oscillating or rotating devices or the like; the combination of a first shaft, means to drive said first shaft, a second shaft, means interconnecting said first and second shafts, means for superimposing the angular velocities of said second and first shafts on said output shaft whereby said output shaft is caused to rotate at an angular velocity which is a function of the resultant of the angular velocities of said first and second shafts, means to adjustably vary the amplitude of the angular velocity of said second shaft superimposed on said output shaft, said means to adjustably vary comprising a crank member connected to and rotatable with said second member, and said means for superimposing comprising means for transmitting the motion of said crank to said output shaft.

24. Apparatus according to claim 23 further characterized in that said means to vary further comprises means to change the position of said crank with respect to the center axis of said second shaft.

25. Apparatus according to claim 24 further characterized in that said second shaft is tubular, an operating shaft extending co-axially with said second shaft, gearing means interconnecting said operating shaft and said crank, and means for driving said operating shaft to change the position of said crank with respect to the center axis of said second shaft.

26. In a differential drive system for oscillating or rotating devices or the like; the combination of a differential power drive having an output shaft and a pair of input drive members whereby the instantaneous velocity of the output shaft is a function of the relative instantaneous velocities of the input drive members, means to drive one of said input drive members at a uniform angular velocity, means to drive the other of said input drive members at an adjustable angular velocity whereby the velocity of said output shaft is cyclically changed from a uniform angular velocity, and means of simultaneously varying the velocity of said input drive members relative to a main driving source.

27. In a differential drive system for oscillating or rotating devices or the like; the combination of a differential power drive having a main driving source and a variable speed transmission, an output shaft and a pair of input drive members whereby the instantaneous velocity of the output shaft is a function of the instantaneous velocities of the input drive members, said input drive members being driven by said variable speed transmission, means to drive one of said input members at a uniform angular velocity, and means to drive the other of said input drive members at an adjustable oscillatory angular velocity whereby the velocity of said output shaft is cyclically changed from a uniform angular velocity.

References Cited in the file of this patent

UNITED STATES PATENTS 2,301,543    Hlavaty _____ Nov. 10, 1942